(12) United States Patent
Itoh et al.

(10) Patent No.: US 8,028,817 B2
(45) Date of Patent: Oct. 4, 2011

(54) CONVEYOR AND CONVEYOR CONTROLLER

(75) Inventors: Kazuo Itoh, Kasai (JP); Toshiyuki Tachibana, Himeji (JP)

(73) Assignee: Itoh Denki Co., Ltd. (JP)

( * ) Notice: Subject to any disclaimer, the term of this patent is extended or adjusted under 35 U.S.C. 154(b) by 80 days.

(21) Appl. No.: 12/587,467

(22) Filed: Oct. 7, 2009

(65) Prior Publication Data

US 2010/0101919 A1   Apr. 29, 2010

(30) Foreign Application Priority Data

Oct. 24, 2008   (JP) ................................ 2008-274885

(51) Int. Cl.
  *B65G 47/26* (2006.01)
(52) U.S. Cl. .................................. 198/460.1; 198/792
(58) Field of Classification Search ............... 198/460.1, 198/781.01, 781.09, 781.1, 783, 784, 790, 198/792
  See application file for complete search history.

(56) References Cited

U.S. PATENT DOCUMENTS

| | | | | |
|---|---|---|---|---|
| 5,979,636 A * | 11/1999 | Vanacore et al. | ......... | 198/460.1 |
| 6,253,909 B1 * | 7/2001 | Kalm et al. | ............. | 198/781.06 |
| 6,843,362 B2 * | 1/2005 | Tachibana et al. | ........ | 198/460.1 |
| 7,542,823 B2 * | 6/2009 | Nagai | .......................... | 198/460.1 |
| 2003/0150695 A1 * | 8/2003 | Cotter et al. | ................ | 198/460.1 |
| 2004/0065526 A1 * | 4/2004 | Zeitler | ......................... | 198/460.1 |
| 2006/0289274 A1 * | 12/2006 | Knepple et al. | ............ | 198/460.1 |

FOREIGN PATENT DOCUMENTS

| | | |
|---|---|---|
| JP | 10-316229 | 12/1998 |
| JP | 10-324418 | 12/1998 |
| JP | 2000-136021 | 5/2000 |
| JP | 2004-075311 | 3/2004 |
| JP | 2004-115152 | 4/2004 |
| WO | WO-2007-055112 | 5/2007 |

\* cited by examiner

*Primary Examiner* — James R Bidwell
(74) *Attorney, Agent, or Firm* — Wood, Phillips, Katz, Clark & Mortimer

(57) ABSTRACT

A conveyor, which has an area in its conveyor line and for adjusting intervals between articles, includes (1) a plurality of zones constituting the area and each having at least one driving motor and an article sensor, (2) structure for measuring either an interval between adjacent articles in the conveying direction or a difference of time points when adjacent articles in the conveying direction pass the sensor, and (3) a motor controller for each of the zones and for varying a rotational speed of the driving motor. When the measuring structure measures either the interval or the difference upon reception of signals from the sensor, the motor controller either accelerates or slows down the rotational speed of the driving motor in a zone where the article is placed.

18 Claims, 9 Drawing Sheets

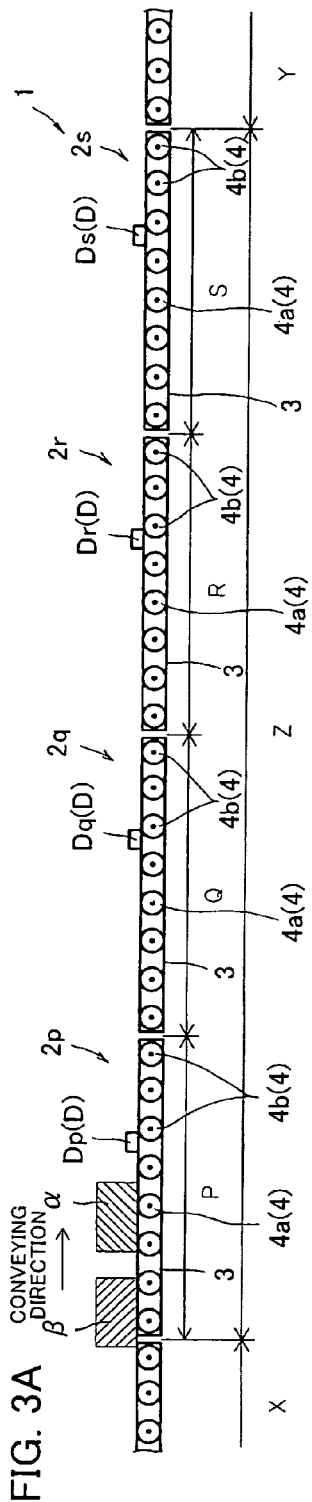
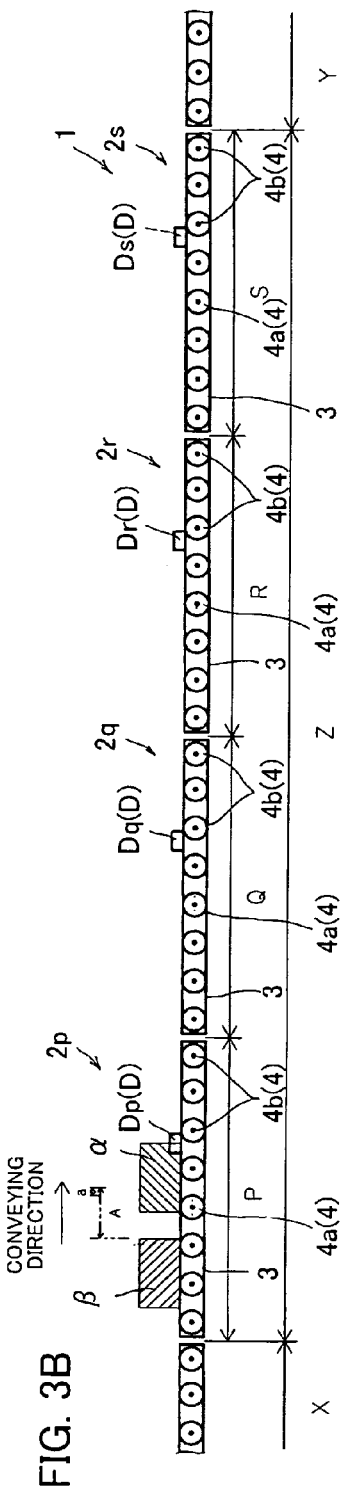
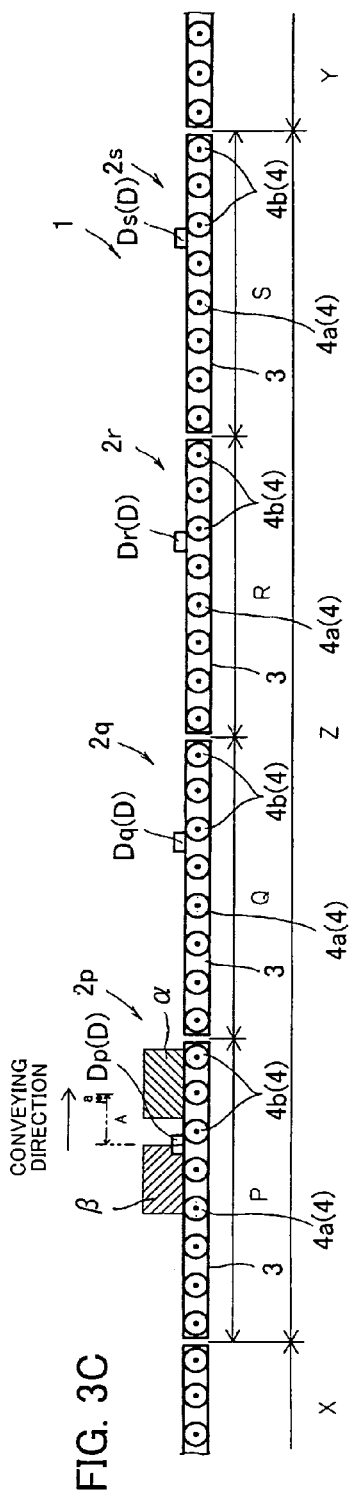

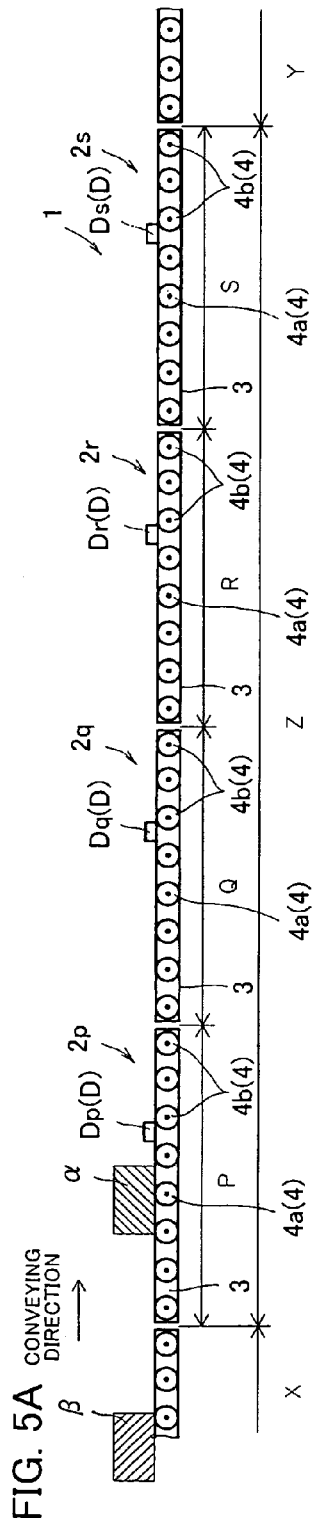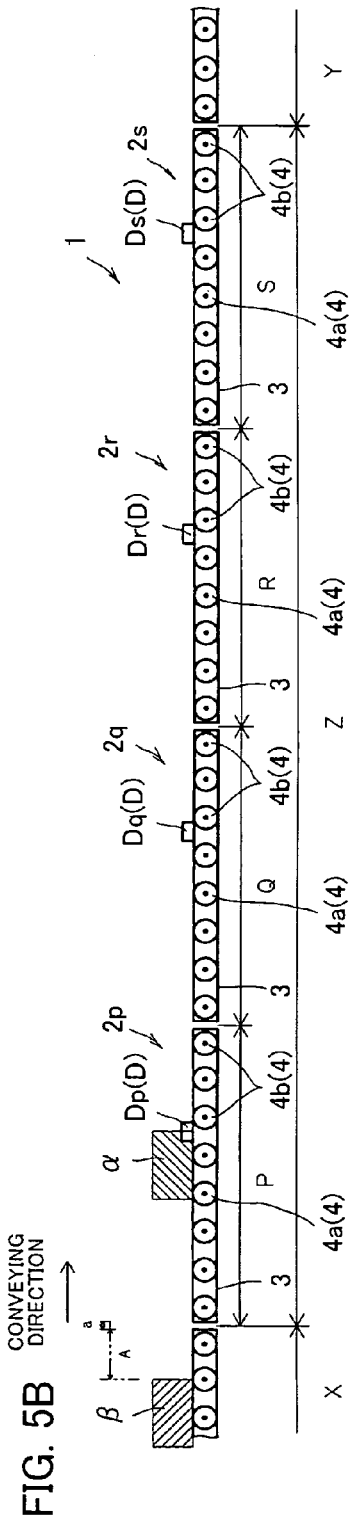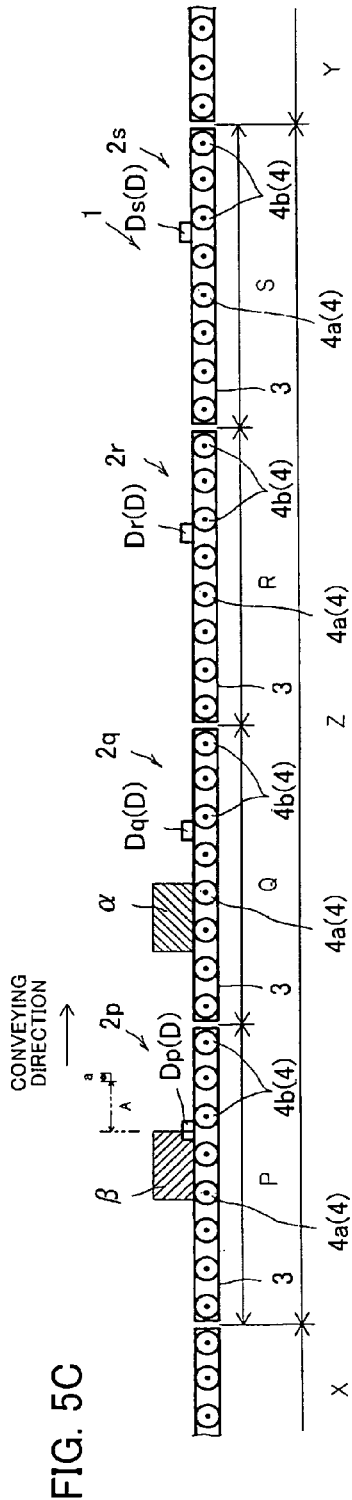

CONVEYOR AND CONVEYOR CONTROLLER

BACKGROUND OF THE INVENTION

1. Field of the Invention

The present invention relates to a conveyor and a conveyor controller capable of conveying articles and adjusting intervals between the articles at substantially regular intervals.

2. Description of the Related Art

Conventionally, conveyors for conveying articles include a roller conveyor having cylindrical rollers for conveyance arranged on a conveyor line and a belt conveyor having a looped belt for conveyance. Generally, such conveyors are often used to convey articles of a plurality of kinds of sizes and shapes.

However, the conventional conveyors have had a difficulty in efficiently sorting such articles being of a plurality of kinds of sizes and shapes. Articles being conveyed on a conveyor line in a conveyor often have irregular intervals, being largely-spaced or narrowly-spaced for example, in a conveying direction. That results in a difficulty in surely sorting a number of articles without lowering conveying efficiency on a conveyor line.

A patent document 1 specified below discloses a conveyor including a first and a second conveyors arranged on a conveyor line and using a conveyor belt for controlling substantially regular intervals between articles.

Patent Document 1: JP 10-324418 A

SUMMARY OF THE INVENTION

Problem to be Solved by the Invention

In the conveyor disclosed in the patent document 1, in a case of irregular intervals between a number of articles, it has been impossible to adjust each of the intervals substantially regularly. Specifically, the conveyor disclosed in the patent document 1 has sensors located at a joint between the first and the second conveyors and upstream of the second conveyor respectively, each sensor detecting an article, so that each interval between articles is controlled substantially regularly. More specifically, the conveyor disclosed in the patent document 1 performs control on the condition that articles should be conveyed with contacting with each other in a conveying direction (conveyance from the first conveyor to the second conveyor), so as to provide substantially regular intervals between articles by lowering a speed of the first conveyor when the sensor located upstream of the second conveyor detects an article. Thus, in a case where articles have no contact with each other or are transferred at irregular intervals into an area where the above-mentioned control is to be performed, it is impossible to provide regular intervals. As a consequence, conveyance is continued with articles positioned at irregular intervals, resulting in a problem of lowering conveyance efficiency in sorting articles.

Taking into account with the above-mentioned problem of the art, the present invention therefore aims to provide a conveyor and a conveyor controller capable of adjusting articles placed on a conveyor line at irregular intervals to substantially regular intervals with certainty so as to efficiently convey the articles.

Means to Solve the Problem

An aspect of the present invention proposed herein to solve the above-mentioned problem is a conveyor including a plurality of zones arranged in a row in a conveying direction, each of the zones having at least one driving motor for generating power to convey articles in the zone and an article sensor for detecting an article in the zone and for transmitting a signal indicating presence or absence of an article, wherein the conveyor further includes (1) a measuring means for measuring either an interval between adjacent articles in the conveying direction or a difference of time points when adjacent articles in the conveying direction pass the article sensor acting as a benchmark and (2) a motor controller for each of the zones and for varying a rotational speed of the driving motor, wherein the measuring means measures the interval or the difference upon reception of signals from the sensor, and wherein the motor controller either accelerates or slows down the rotational speed of the driving motor in a zone in which at least one of the articles is placed so as to either increase or decrease a speed for conveying articles, thereby adjusting the interval between the articles.

The conveyor in the present aspect includes the measuring means adapted to measure an interval between adjacent articles in the conveying direction or a difference of time points when adjacent articles in the conveying direction pass the article sensor based on a signal detected by the article sensor and the motor controller adapted to vary the rotational speed of the driving motor. Upon measuring of the interval or the difference by the measuring means, the driving motor is either accelerated or slowed down in the rotational speed, so as to control the interval between the articles. Therefore, even if a number of articles placed on a conveyor line are conveyed at irregular intervals, the articles are certainly adjusted at substantially regular intervals while being conveyed since the rotational speed of the driving motor is controlled by the motor controller.

For example, an interval between articles A and B or a difference of time points when articles A and B pass the article sensor is adjusted to a preset interval or a preset difference of time points, when being measured. Specifically, the rotational speed of the driving motor in a zone where the articles A and B or only the article B is placed is either accelerated or slowed down. Then, the interval or the difference is narrowed or widened when the articles A and B reach different zones. Such a control is executed until the articles are adjusted at a regular interval or difference.

Consequently, according to the present aspect, even if articles increase in number, like A, B, C, and . . . , control of the driving motors in zones where the articles are placed based on detected signals ensures intervals between the articles or differences of time points when the articles pass the article sensors be adjusted to a regular interval or difference. That enables to make efficient use of operating time of the conveyor. Further, when articles are sorted downstream of the conveyor line, the conveyor maintains substantially regular intervals between articles, thereby efficiently sorting the articles.

The conveyor in this aspect is preferably adapted to either accelerate or slow down the rotational speed of the driving motor in a case where either the interval or the difference is out of a predetermined range.

By such a conveyor, the motor controller executes control in a case where an interval between articles is out of the predetermined range, thereby performing more efficient conveyance.

Preferably, the conveyor in this aspect is adapted to accelerate the rotational speed of the driving motor relating to an article adjacent to and behind another article in the conveying direction in a case where either the interval or the difference is beyond a predetermined upper limit, and adapted to slow down the rotational speed of the driving motor relating to the article in a case where either the interval or the difference is below a predetermined lower limit.

By such a conveyor, the driving motor is controlled in such a manner as to be accelerated in a case where the interval between articles is beyond the predetermined upper limit, and to be slowed down in a case where the interval between articles is below the predetermined lower limit. That ensures the interval between the articles be adjusted within the predetermined range.

Preferably, the conveyor in this aspect has a first area for adjusting the intervals between articles and a second area without adjusting the intervals, wherein the motor controller is for the first area, and wherein the first-area includes a plurality of zones arranged in a row in the conveying direction.

By such a conveyor, adjacent articles in the conveying direction are controlled within the predetermined range only in a specific area. That avoids a considerable increase in operating electric power. Consequently, efficient conveyance is allowed as the conveyor in whole, thereby ensuring energy conservation.

The first area is preferably disposed downstream of the second area.

Provision of the first area, that is, an area for adjusting intervals between articles, at downstream in the conveyor line facilitates preventing the adjusted intervals from being disordered until the articles are conveyed to the end of the conveyor.

The second area may also include a plurality of zones arranged in a row in the conveying direction similarly to the first area.

The conveyor in this aspect preferably has a sorting area adapted to sort a plurality of kinds of articles and disposed adjacent to and downstream of the first area in the conveying direction.

By such a conveyor, the first area is disposed upstream of and adjacent to the sorting area adapted to sort articles of various sizes and shapes. Thus, when being transferred to the sorting area, articles have been adjusted at substantially regular intervals or differences within the predetermined range. That eliminates the need for further control. Consequently, articles are efficiently sorted in the sorting area.

Preferably, in the conveyor in this aspect, the plurality of zones include a first zone and a second zone adjacent to and upstream of the first zone, and the conveyor is adapted to stop the driving motor in the second zone in a case where the rotational speed of the driving motor driving the first zone is slowed down and the sensor in the second zone detects an article.

Such a conveyor prevents collision of an article conveyed at a lower speed in the first zone and an article conveyed upstream of the first zone at a constant and normal speed. That protects articles from deviating from the conveyor line, so as to efficiently convey articles. Herein, whether a zone further upstream of the zone upstream of and adjacent to the first zone should be stopped or not can be appropriately determined. "The second zone upstream of the first zone" may be within the above-mentioned second area (the area without adjusting intervals between articles). Also in this case, whether the second area should be completely stopped or not may be appropriately determined.

The conveyor in this aspect is preferably adapted to stop the driving motor in a zone in which the sensor has not detected an article for a predetermined period of time.

Such a conveyor eliminates wasteful electric power consumption, thereby achieving cost savings.

In the conveyor in this aspect, each of the zones preferably has at least one conveying roller driven by the driving motor.

In the above-mentioned conveyor, more preferably, at least one of the conveying rollers is a motorized roller incorporating the driving motor.

By such a configuration, variation of the rotational speed of the driving motor directly varies the conveying speed of each zone.

In the conveyor in this aspect, it is preferable that the driving motor is a brushless motor incorporating a Hall element for monitoring a rotational position of the motor and for outputting pulses according to the position, so that the measuring means measures the interval between articles based on the number of the pulses.

By such a configuration, a Hall element incorporated in the brushless motor is used to measure an interval between articles. Consequently, the present invention is efficiently embodied by a simple configuration.

Another aspect of the present invention is a conveyor controller for controlling a conveyor, wherein the conveyor includes a plurality of zones arranged in a row in a conveying direction, each of the zones having at least one driving motor for generating power to convey articles in the zone and an article sensor for detecting an article in the zone and for transmitting a signal indicating presence or absence of an article, wherein the conveyor controller includes (1) a measuring means for measuring either an interval between adjacent articles in the conveying direction or a difference of time points when adjacent articles in the conveying direction pass the article sensor acting as a benchmark and (2) a motor controller for each of the zones and for varying a rotational speed of the driving motor, and wherein, upon reception of signals from any of the sensors, the measuring means measures the interval or the difference and the motor controller either accelerates or slows down the rotational speed of the driving motor in a zone in which at least one of the adjacent articles in the conveying direction is placed, so that the conveyor controller either increases or decreases a speed for conveying articles so as to adjust the interval between the articles.

Such a conveyor controller uses a measuring means to measure either an interval between articles or a difference of time points when adjacent articles in the conveying direction pass the article sensor upon reception of a detection signal from the article sensor, thereby adjusting the interval between the articles, so that the articles on the conveyor line are efficiently conveyed. In other words, in this conveyor controller, the motor controllers maintain regular intervals between articles if the articles have been placed on the conveyor line at irregular intervals by controlling the rotational speed of the driving motor. Further, since this conveyor controller makes articles to be conveyed at substantially regular intervals, this conveyor controller provides conditions conductive to a conveying operation without reducing conveying efficiency even in a case of sorting the articles at downstream.

Advantageous Effect of the Invention

The conveyor and the conveyor controller in the present invention adjust either intervals between articles or differences of time points when adjacent articles in the conveying direction pass the article sensors in the first area (area for adjusting intervals between articles) constituted by a plurality of zones, thereby ensuring the articles be arranged at substantially regular intervals, so as to achieve efficient conveyance.

BRIEF DESCRIPTION OF THE DRAWINGS

FIGS. 3A to 3C are explanatory diagrams showing statuses of control (at lower speed) in the adjusting area relating to the embodiment of the present invention. FIG. 3A shows a status in which articles α and β are conveyed in a zone P, FIG. 3B shows a status in which the article α is detected by an article sensor in the zone P, and FIG. 3C shows a status in which the article β is detected by the article sensor in the zone P;

FIG. 4 shows a status in which the articles α and β keeping a predetermined range of interval are conveyed in a zone Q;

FIGS. 5A to 5C are explanatory diagrams showing statuses of control (at higher speed) in the adjusting area relating to the embodiment of the present invention.

FIG. 5A shows a status in which the article α is conveyed in the zone P, FIG. 5B shows a status in which the article α is detected by the article sensor in the zone P, and FIG. 5C shows a status in which the article β is detected by the article sensor in the zone P;

FIG. 6 shows a status in which the articles α and β keeping a predetermined range of interval are conveyed in the zone Q;

DESCRIPTION OF THE PREFERRED EMBODIMENT

Figure 1:
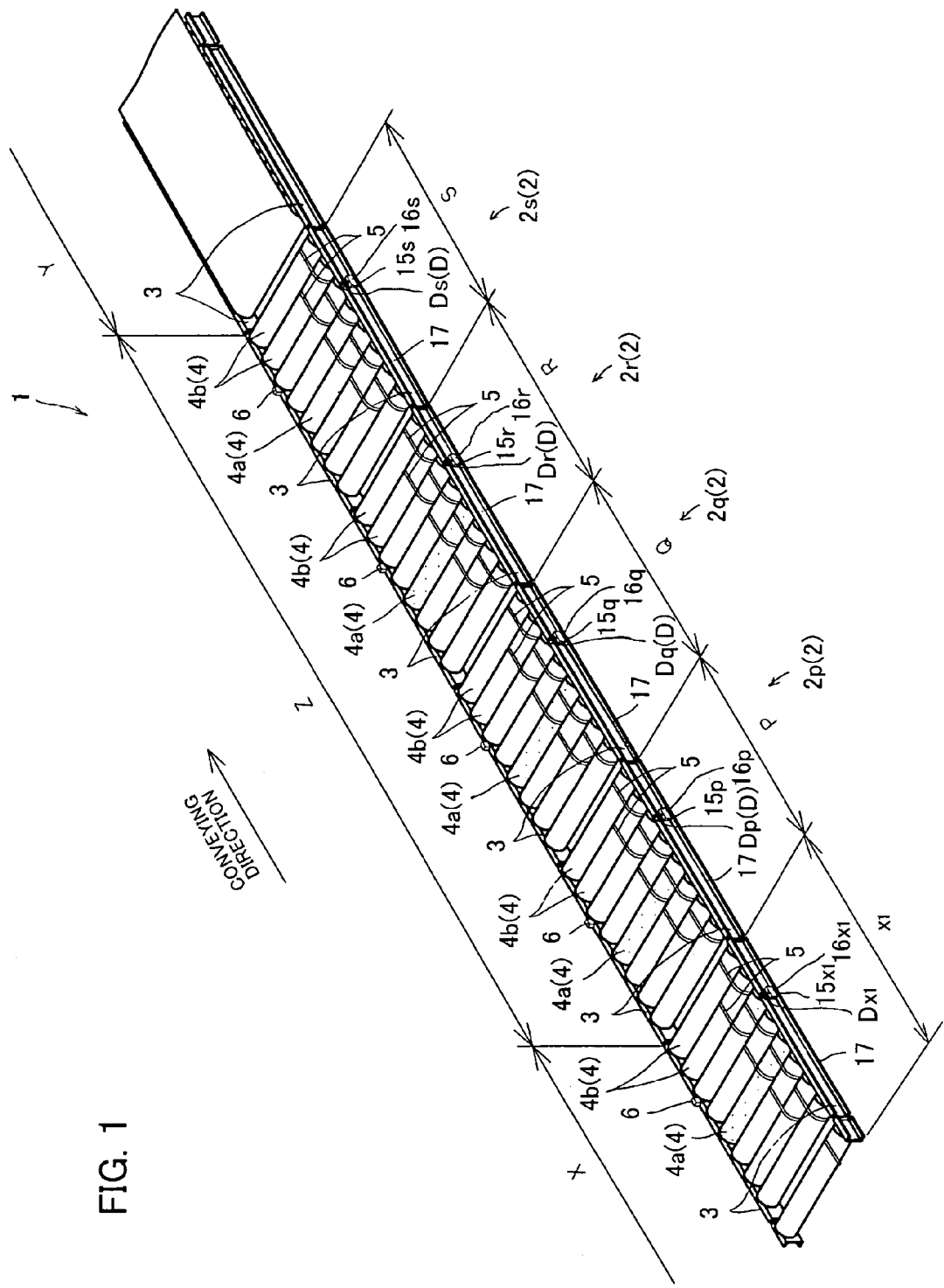
FIG. 1 is a perspective view showing an area for adjusting intervals between articles of a conveyor relating to an embodiment of the present invention.
Figure 2:
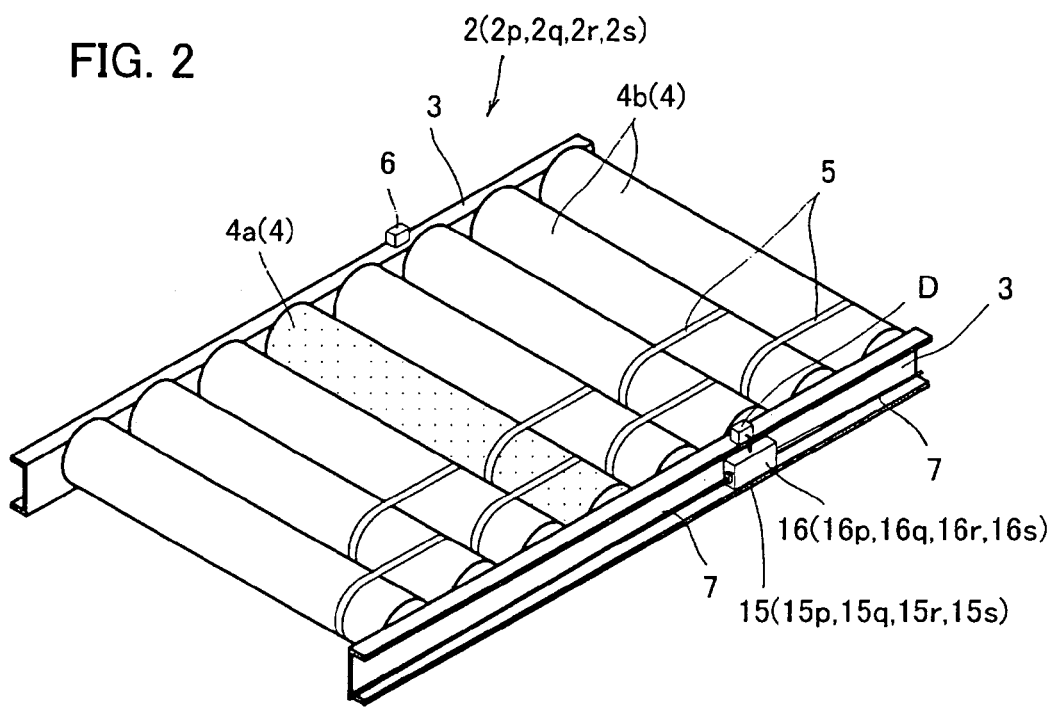
FIG. 2 is a perspective view of a conveyor unit of the conveyor, relating to the embodiment of the present invention.

Now, a preferred embodiment of the present invention will be described below, making a reference to the accompanying drawings. FIG. 1 is a perspective view showing an area for adjusting intervals between articles of a conveyor relating to the embodiment of the present invention. FIG. 2 is a perspective view of a conveyor unit of the conveyor relating to the embodiment of the present invention.

A conveyor 1 in the preferred embodiment has a conveyor line composed of a plurality of control zones (zones for control), being roughly divided into an adjusting area (first area) Z for adjusting intervals between articles and a conveying area (second area) X. The adjusting area Z is constituted by four control zones P, Q, R, and S, and the conveying area X is constituted by other plurality of zones. There is provided a sorting conveyor (hereinafter also referred to as a sorting area) Y forming a part of the conveyor line at the most downstream of the conveyor 1.

In the conveyor 1 in this embodiment, the conveying area X, the adjusting area Z, and the sorting area Y are arranged in this order from upstream in the conveying direction. The sorting conveyor Y is disposed downstream of the adjusting area Z.

Firstly, a basic configuration in common between the conveying area X and the adjusting area Z in the conveyor 1 will be described below in detail.

Referring to FIG. 1, the adjusting area Z in the conveyor 1 in this embodiment includes a plurality of conveyor units 2p, 2q, 2r, and 2s arranged in series in the conveying direction. The conveyor units 2p, 2q, 2r, and 2s each have the same configuration, in which a plurality of conveying rollers 4 for conveying articles are supported rotatably on shafts and in a row at predetermined intervals in the conveying direction between a pair of side frames 3 and 3 positioned parallel on each side. Hereinafter, the conveyor units 2p, 2q, 2r, and 2s are designated only as the numeral 2 in a general description. The conveying rollers 4 of a unit 2 consist of a motorized roller 4a incorporating a driving motor M and a plurality of driven rollers 4b that freely rotate. Adjacent conveying rollers 4 in the conveyor unit 2 are wound by a transmission belt 5. In this embodiment, each unit 2 has one motorized roller 4a disposed in its center and a plurality of driven rollers 4b disposed at the rest part. Rotary driving force by the motorized roller 4a is transmitted to all the driven rollers 4b in the same unit. A conveying speed of each conveyor unit 2p, 2q, 2r, or 2s is determined by a rotational speed of the motorized roller 4a disposed in the respective unit. The rotational speed of the motorized roller 4a is determined by a rotational speed of the motor (driving motor disposed in the respective unit) M incorporated in the roller 4a. Conveyor units in the conveying area X each have the same configuration as the conveyor unit 2 in the adjusting area Z. Herein, only a conveyor unit X1 disposed at the most downstream is shown in FIG. 1.

Referring to FIG. 2, the conveyor units 2p, 2q, 2r, and 2s respectively include zone controllers 15p, 15q, 15r, and 15s each for executing driving control of the motorized roller 4a and drivers 16p, 16q, 16r, and 16s each for driving and stopping of the motorized roller 4a upon reception of signals from the zone controllers 15p, 15q, 15r, and 15s. The zone controllers 15p, 15q, 15r, and 15s have the same configuration and so do the drivers 16p, 16q, 16r, and 16s. Thus, hereinafter, the zone controller and the driver are designated as the numerals 15 and 16 respectively in a general description. The zone controller 15 and the driver 16 are electrically connected via a signal line 17 (see FIG. 9). Further, the zone controller 15 is connected to adjacent controllers 15 and a supervisory controller 10 via signal lines 17. The supervisory controller 10 is constituted by, e.g., a programmable logic controller (P.L.C). Specifically, the zone controller 15 generates and outputs signals to the driver 16 upon reception of external input signals such as RUN/STOP signals and CW/CCW signals (signals indicating a conveying direction) from the supervisory controller 10 centrally controlling operational statuses of the conveyor line, thereby controlling the motor M. Further, the zone controller 15 switches a conveyance mode between a slug conveyance mode and a singulation conveyance mode. Herein, since such modes have no direct relation with the present invention, descriptions of those are omitted.

In the control zone P, a presence sensor (article sensor) Dp, which may be a photoelectronic sensor, is disposed on one of the side frames 3, whereas a light-emitting device 6 such as a light-emitting diode or an infrared diode is disposed on the other of the side frames 3. When an article is conveyed to a predetermined position where the light-emitting device 6 is disposed, the article intercepts light from the device 6, thereby turning on and off the photoelectronic sensor. That enables detection of the article having been conveyed to the predetermined position.

In other words, an output of the presence sensor Dp is utilized as a presence signal for indicating either presence or absence of an article in the control zone P. Herein, the other control zones Q, R, and S and the conveying area X are also provided with presence sensors Dq, Dr, Ds, Dx1, . . . (or D in a general description) each having the same configuration as the presence sensor Dp in the respective conveyor units 2. The presence sensor D is disposed downstream of the center in a conveying direction in each control zone. And other light-emitting devices 6 are respectively disposed opposite the sensors Dq, Dr, Ds, Dx1 . . . . The presence sensor D outputs an On signal (H level) when detecting presence of an article and outputs an Off signal (L level) when not detecting presence of an article.

In this way, the control zones P, Q, R and S and the control zones of the conveying area X in the conveyor line each perform independent conveying control in response to signals such as a detection signal from each sensor D or a signal transmitted from its upstream and downstream control zones, so as to ensure cooperative conveyance as the conveyor line.

Next, the adjusting area Z for adjusting intervals between articles in the conveyor 1 relating to the present invention will be described in detail below.

The adjusting area Z includes measuring structure to measure interval between articles. In one form, the measuring structure is a means (measuring means) for measuring an interval between articles, with the adjusting area Z further including a means (motor controller) for increasing and decreasing the conveying speed by varying the rotational speed of the driving motor M besides the above-mentioned configuration. The driving motor M is a brushless motor having the known configuration and incorporated in the motorized roller 4*a*. The brushless motor also functions as the measuring means. Specifically, an interval between articles is measured by the number of pulses outputted from a Hall element monitoring a rotational position of the brushless motor. More specifically, the interval is calculated by counting the number of the pulses.

Further, the zone controller 15 functions as the motor controller.

In the adjusting area Z, the above-mentioned configuration enables to adjust intervals between articles within a predetermined range by using signals from the presence sensor D and to protect articles from collision. Specifically, upon detection of articles by the presence sensor D, the measuring means measures a distance between the articles. When the measured distance is out of a predetermined range preset in the zone controller 15, the motor controller controls rotation of the driving motor M, thereby adjusting the distance between the articles within the predetermined range.

Figure 4:
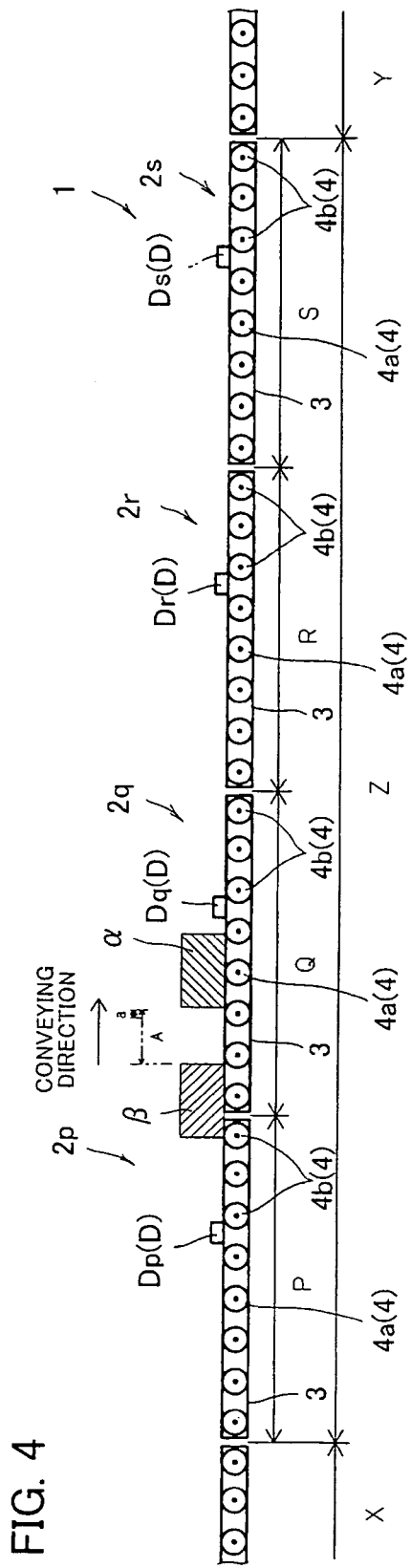
FIG. 4 is another explanatory diagram showing a status of the control (at lower speed) in the adjusting area relating to the embodiment of the present invention.
Figure 6:
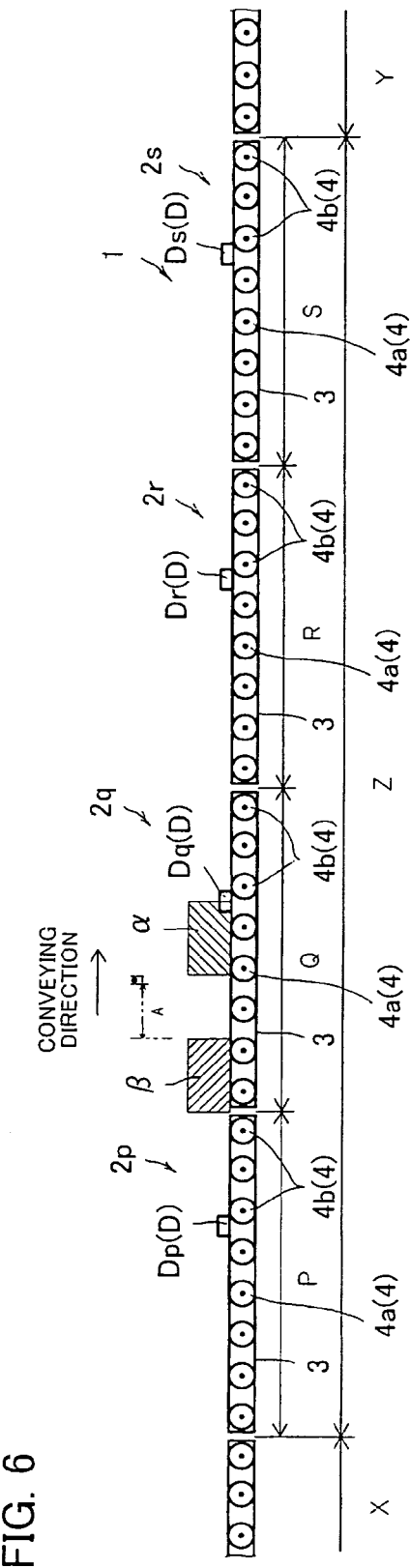
FIG. 6 is another explanatory diagram showing a status of the control (at higher speed) in the adjusting area relating to the embodiment of the present invention.
Figure 7:
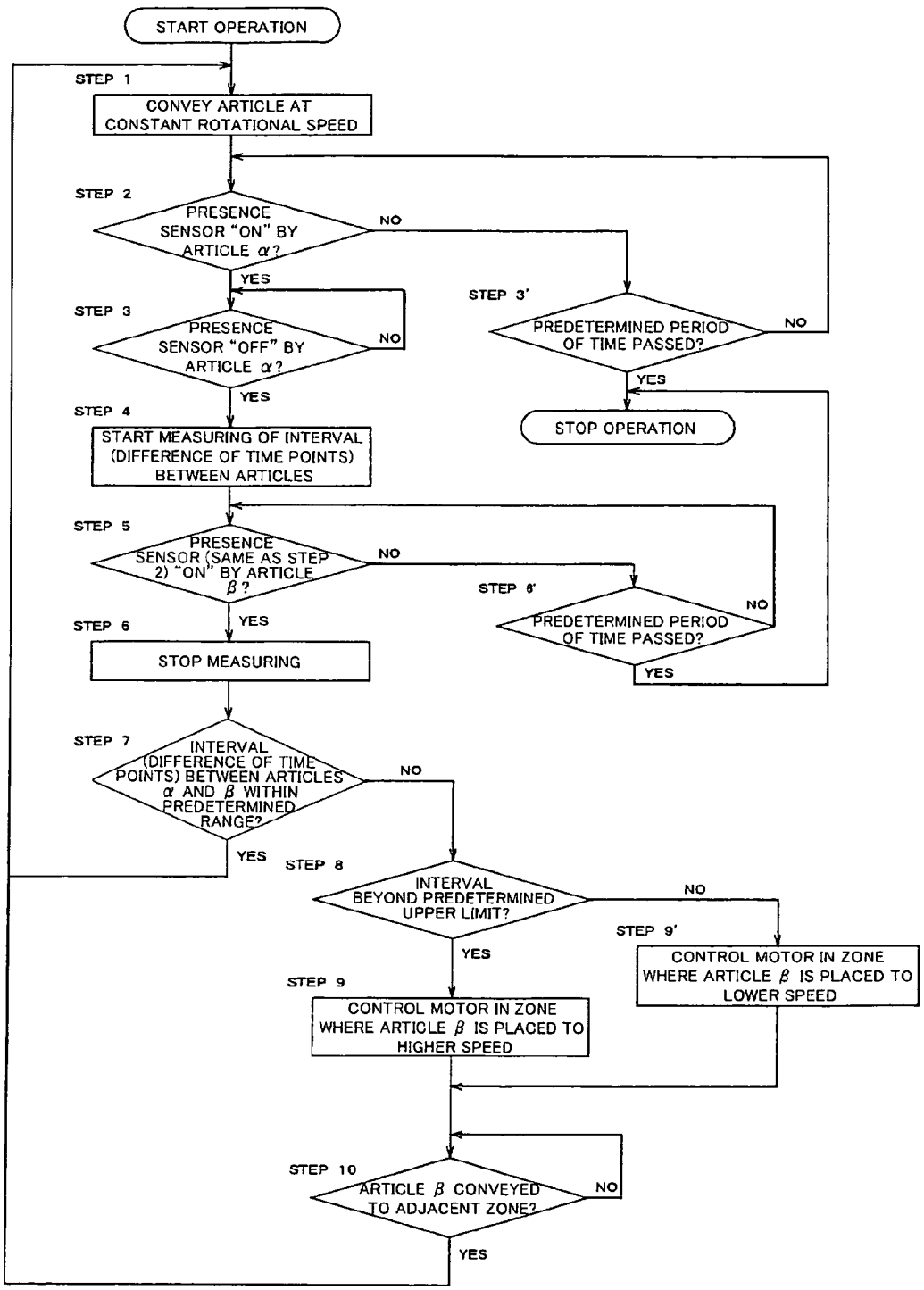
FIG. 7 is a flow chart showing a first control of a control zone in the adjusting area relating to the embodiment of the present invention.
Figure 8:
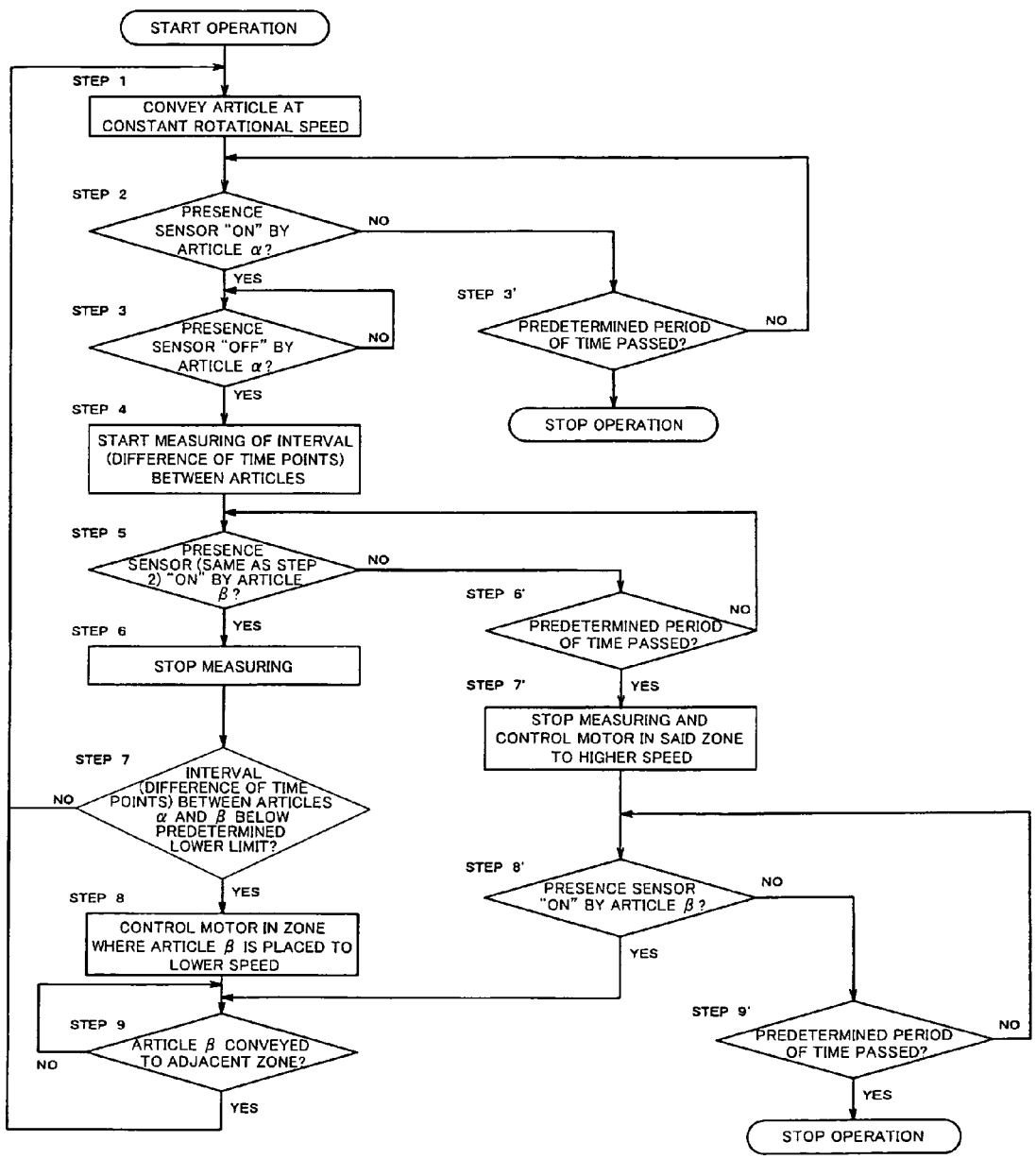
FIG. 8 is another flow chart showing a second control of a control zone in the adjusting area relating to the embodiment of the present invention.
Figure 9:
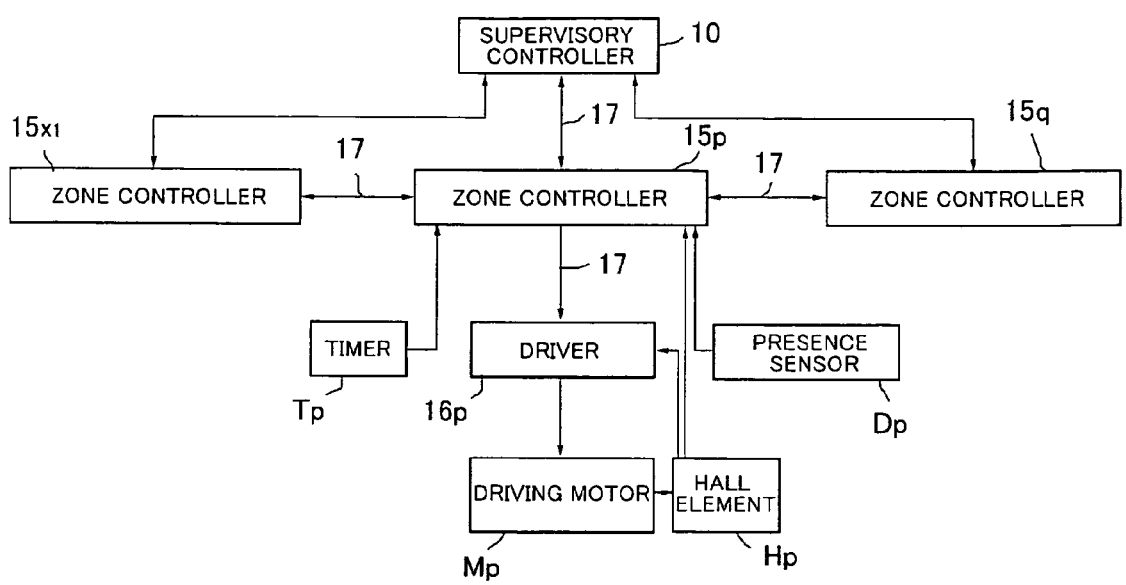
FIG. 9 is a block diagram showing a flow of signals in the embodiment of the present invention.

A series of control of the present embodiment will be described in detail below, making reference to the figures. This description mentions only two articles α and β for easy comprehension, but the present invention is not limited thereto and more than two articles may be used. FIGS. 3A to 3C are explanatory diagrams showing statuses of a control (lower speed) in the adjusting area relating to the embodiment of the present invention. FIG. 3A shows a status in which the articles α and β are conveyed in the zone P, FIG. 3B shows a status in which the article α is detected by the article sensor in the zone P, and FIG. 3C shows a status in which the article β is detected by the article sensor in the zone P. FIG. 4 is another explanatory diagram showing a status of the control (lower speed) in the adjusting area Z relating to the embodiment of the present invention. FIG. 4 shows a status in which the articles α and β keeping a predetermined range of interval are conveyed in the zone Q. FIGS. 5A to 5C are explanatory diagrams showing statuses of control (higher speed) in the adjusting area Z relating to the embodiment of the present invention. FIG. 5A shows a status in which the article α is conveyed in the zone P, FIG. 5B shows a status in which the article α is detected by the article sensor in the zone P, and FIG. 5C shows a status in which the article β is detected by the article sensor in the zone P. FIG. 6 is another explanatory diagram showing a status of the control (higher speed) in the adjusting area Z relating to the embodiment of the present invention. FIG. 6 shows a status in which the articles α and β keeping a predetermined range of interval are conveyed in the zone Q. FIG. 7 is a flow chart showing a first control of a control zone in the adjusting area Z relating to the embodiment of the present invention. FIG. 8 is a flow chart showing a second control of a control zone in the adjusting area Z relating to the embodiment of the present invention. FIG. 9 is a block diagram showing a flow of signals in the embodiment of the present invention.

(First Control)

Firstly, the conveyor 1 starts an operation after placement of the articles α and β in the conveying area X. In the conveying area X, the articles α and β are conveyed downstream in this order at a normal and constant speed. When the to article α is detected by the presence sensor Dx1 (FIG. 1) in the most downstream control zone in the conveying area X, the sensor Dx1 outputs an On signal. The zone controller 15*x*1 in this zone receives the On signal and outputs a signal. Then, the zone controller 15*p* in the control zone P belonging to the adjusting area Z receives the signal having been outputted from the zone controller 15*x*1, thereby starting to drive the motorized roller 4*a* in the control zone P. The motorized roller 4*a* drives at a constant speed v3 (STEP 1). Such a control is executed so as to introduce an article into a zone adjacent to and downstream in the conveying direction of a control zone in which the article has been detected by the presence sensor D, and is executed in common in all control zones in the conveyor 1.

As shown in FIG. 3A, the articles α and β are transferred from the conveying area X to the control zone P and conveyed in the control zone P. Then, as shown in FIG. 3B, the article α is detected by the presence sensor Dp in the control zone P, so that the sensor Dp outputs an On signal. The On signal is received by the zone controller 15*p* in the zone P (STEP 2). Herein, in a case where no article is conveyed to the control zone P for example, the control proceeds to STEP 3' since an On signal is not outputted to the zone controller 15*p* by the presence sensor Dp, while the zone controller 15*p* waits an On signal from the sensor Dp for a predetermined period of time. That means the zone controller 15*p* waits until an article is conveyed to a position of the presence sensor Dp. In a case where an On signal from the sensor D is not detected while waiting, the operation in the zone P is stopped. Such a case includes two situations. One situation is that no article is actually conveyed to the control zone P. The other situation is that some abnormalities are caused in the sensor Dp even though an article is actually conveyed to the zone P. In the latter situation, a sufficient predetermined period of time for waiting avoids such a problem in which the article α stops on the conveying line because the article α has been transferred to the control zone Q downstream in the conveying direction before the operation in the zone P is stopped.

When an upstream end (tail end) in the conveying direction of the article α having been detected in STEP 2 passes the presence sensor Dp, the sensor Dp outputs an Off signal (STEP 3). The measuring means measures the interval between the articles α and β in the conveying direction from the moment of reception of the Off signal by the zone controller 15*p* in the control zone P (STEP 4). Specifically, in this embodiment, a distance between articles is measured based on the number of pulses generated by rotation of the brushless motor incorporated in the motorized roller 4a. More specifically, the distance is calculated by counting of the number of the pulses.

As shown in FIG. 3C, when a downstream end (leading end) in the conveying direction of the article β reaches the position of the presence sensor Dp, the sensor Dp outputs an On signal again (STEP 5). In a case where no article is conveyed to the position of the presence sensor Dp, for example, in STEP 5, the control proceeds to STEP 6' in which the zone controller 15p waits until an article is conveyed to the position of the presence sensor Dp for a predetermined period of time without varying a conveying speed. In a case where no article has been reached the position of the sensor Dp in the zone P after the predetermined period of time, the operation in the zone P is stopped.

When the zone controller 15p in the control zone P receives the On signal having been outputted from the sensor Dp in STEP 5, measuring of the interval between the articles α and β is finished (STEP 6). Thereafter, the measured interval is compared with a predetermined range of interval between articles preset in the zone controller 15p (STEP 7). In this embodiment, the predetermined range of interval means a predetermined value A with a leeway ±a, being designated as A±a. The predetermined value A is sufficiently larger than the leeway a.

Herein, if the measured interval between the articles α and β is within the predetermined range A±a, the control zone p maintains the constant speed v3 and starts another control from STEP 1 again. If the interval is out of the predetermined range A±a and below a predetermined lower limit (A−a) as shown in FIG. 3C, control to widen the interval between the articles α and β is performed (STEP 8). Specifically, when the downstream end (leading end) of the article β is detected by the presence sensor Dp, the motor controller in the zone controller 15p in the control zone P varies the rotational speed of the motorized roller 4a to a lower speed v1 (v1<v3) so as to slow down the conveying speed of the article β (STEP 9'). In other words, a relative speed of the articles α and β is varied so that the articles α and β move apart from each other. Specifically, since the control zone Q keeps the constant speed v3, the interval between the articles α and β α is widen at the above-mentioned relative speed. Herein, the articles α and β are conveyed at the same speed (v1) in the control zone P until the article α is transferred to the control zone Q after execution of the speed control.

According to the conveyor 1 in the present invention, the rotational speed of the motorized roller 4a is varied to the lower speed v1 at the moment of detection of the downstream end of the article β (an article situated upstream) by the presence sensor D. Thus, even with an extremely short interval between articles, the motor controller ensures the control of the article β for a predetermined distance. Consequently, according to the conveyor controller in the present invention, the control zone P in which articles are placed is controlled by the motor controller without fail if the articles are conveyed at an interval out of the predetermined range A±a, so that the articles β is conveyed at the lower speed v1 until reaching the control zone Q adjacent to and downstream in the conveying direction of the control zone P.

Then, as shown in FIG. 4, when the article β is transferred to the control zone Q (STEP 10), the control zone P executes another control from STEP 1 again on another article transferred from the upstream. Further, the same controls are executed also in the control zones Q, R, and S, thereby ensuring adjustment of intervals between articles to the predetermined lower limit (A−a) or above until the articles reach the sorting conveyor Y. Consequently, even a number of articles are sorted without fail. Herein, in a case, where another article has been conveyed in the conveying area X in execution of the above-mentioned control, conveyance within the conveying area X is temporarily stopped when the rotational speed of the motorized roller 4a in the control zone P is varied to the lower speed v1. Similarly, in a case where another article has been conveyed in the control zone P when the rotational speed of the motorized roller 4a in the control zone Q is varied to the lower speed v1, conveyance within the control zone P is temporarily stopped. The same can be said in further downstream zones.

In contrast, as shown in FIG. 5A, in a case where the interval between the articles α and β having been conveyed in the control zone P is beyond the predetermined upper limit (A+a), control to narrow the interval is executed (STEP 8). Specifically, as shown in FIGS. 5B and 5C, when the presence sensor Dq detects the upstream end (tail end) of the article α and detects the downstream end (leading end) of the article β, the motor controller in the zone controller 15p in the control zone P varies the rotational speed of the motorized roller 4a to a higher speed v2 (v2>v3) (STEP 9). In other words, a relative speed of the articles α and β is varied so that the articles α and β approach each other. Specifically, since the control zone Q keeps the constant speed v3, the interval between the articles α and β is narrowed at the above-mentioned relative speed. Similarly to the case of the above-mentioned control at the lower speed v1, the control zone P varies the conveying speed to the higher speed v2 at the moment of detection of the leading end of the article β by the presence sensor Dp, so that the article β is conveyed at the higher speed v2 without fail until reaching the control zone Q.

Then, as shown in FIG. 6, when the article is transferred to the control zone Q (STEP 10), the control zone P executes another control from STEP 1 again on another article transferred from the upstream. Further, the same controls are executed also in the control zones Q, R, and S, thereby ensuring adjustment of intervals between articles within the predetermined range (A+a) until the articles reach the sorting conveyor Y. Consequently, even a number of articles are sorted without fail.

(Second Control)

Next, a second control employed in this embodiment will be described below.

In this control, since the same steps as described with respect to the first control are executed from the step of starting of the operation to STEP 4, description of those is omitted. The steps beginning with STEP 5 will be described in detail below, making reference to FIG. 8.

Upon starting of measuring of the interval between the articles α and β in STEP 4, a distance between the articles α and β is measured based on the number of pulses generated by the rotation of the brushless motor incorporated in the motorized roller 4a. As shown in FIG. 3C, when a downstream end (leading end) in the conveying direction of the article β reaches the position of the presence sensor Dp, the sensor Dp outputs an On signal (STEP 5). Then, the measuring of the interval between the articles α and β is finished (STEP 6) and the control proceeds to STEP 7.

In STEP 7, the measured interval is compared with the predetermined lower limit (A−a) preset in the zone controller 15p. If the interval is below the predetermined lower limit (A−a), the control to widen the interval is executed (STEP 8). Specifically, the rotational speed of the motorized roller 4a in the control zone P in which the article β is placed is varied to the lower speed v1 so as to slow down the conveying speed of the article β. Similarly to the first control, after initiation of the speed control, the articles α and β are conveyed at the same speed (v1) in the control zone P until the article α is transferred to the control zone Q. Then, as shown in FIG. 4, when the articles α and β are transferred to the control zone Q (STEP 10), the control zone P executes another control from STEP 1 again on another article transferred from the upstream.

In contrast, if the interval between articles is above the predetermined lower limit (A−a), the control zone P maintains the constant speed v3 and starts another control from STEP 1 again.

Further, the same controls are executed also in the control zones Q, R, and S, thereby achieving the same effect as described in the first control. Herein, in a case where another article has been conveyed in the conveying area X in execution of the above-mentioned control, conveyance within the conveying area X is temporarily stopped when the rotational speed of the motorized roller 4a in the control zone P is varied to the lower speed v1. Similarly, in a case where another article has been conveyed to the control zone P when the rotational speed of the motorized roller 4a in the control zone Q is varied to the lower speed v1, conveyance within the control zone P is temporarily stopped. The same can be said in further downstream zones.

Further, a case where the interval between the articles α and β having been conveyed in the control zone P is beyond the predetermined upper limit (A+a) as shown in FIG. 5A will be described below. The zone controller 15p waits maintaining the rotational speed of the motorized roller 4a and the conveying speed of the control zone P for a predetermined period of time unless the presence sensor Dp detects the article β (STEP 6'). At this time, when the number of pulses generated by the brushless motor, which is used to measure an interval between articles, reaches the number of pulses corresponding to the upper limit (A+a) of the interval, the measuring means stops measuring of the interval and the zone controller 15p varies the rotational speed of the motorized roller 4a in the control zone P to the higher speed v2 (STEP 7'). In other words, if the measured interval is above the upper limit (A+a), the rotational speed of the motorized roller 4a is increased to the higher speed v2. Herein, the article β has not been detected by the presence sensor Dp when the rotational speed of the motorized roller 4a is adjusted at the higher speed v2. Consequently, by the second control, even if the interval between the articles α and β is extremely wide, the rotational speed of the motorized roller 4a in the control zone P is varied to the higher speed v2 before the article β is detected by the presence sensor Dp, so that the interval is narrowed more efficiently.

Then, when the article β is conveyed and the presence sensor Dp in the control zone Dp outputs an On signal (STEP 8'), the control proceeds to STEP 9. In STEP 9, when the article β is transferred to the control zone Q, the control zone P executes another control from STEP 1 again on another article transferred from the upstream. Further, the same controls are executed also in the control zones Q, R, and S, thereby ensuring adjustment of intervals between articles within the predetermined range (A±a) until the articles reach the sorting conveyor Y. Consequently, even a number of articles are sorted without fail.

In a case where the presence sensor Dp does not output an On signal even with higher speed rotation of the motorized roller 4a in the control zone P, the zone controller 15p waits maintaining the higher speed rotation of the motorized roller 4a for a predetermined period of time until reception of the On signal (or until the article β has been conveyed to the position of the sensor Dp) (STEP 9'). In a case where the zone controller 15p does not receive the On signal, or the article β has not been conveyed, after the predetermined period of time, driving of the motorized roller 4a is stopped.

Consequently, according to the conveyor 1 in the preferred embodiment, even if an interval between articles conveyed from the conveying area X is out of the predetermined range (A±a), the interval is adjusted at a substantially regular interval while the articles are conveyed in the adjusting area Z composed of the four control zones P, Q, R, and S. That ensures a number of articles be sorted at the sorting conveyor Y disposed at the most downstream of the conveyor 1. In other words, the conveyor 1 in the present invention prevents irregular intervals between articles and achieves substantially regular intervals therebetween, thereby reducing operating time and ensuring efficient conveyance. That also reduces an electrical cost for conveyance. Though only two articles α and β are mentioned in this embodiment, the same can be said to a case of more than two articles. If there are three articles α, β, and γ in this order, for example, both intervals between α and β and between β and γ are adjusted. If there are four articles α, β, γ, and δ in this order, for example, all intervals between α and β, between β and γ, and between γ and δ are adjusted.

The present invention further includes various modifications besides the preferred embodiment. For example, the preferred embodiment has a configuration including the adjusting area Z so as to adjust intervals between articles within a predetermined range in a predetermined section, but the present invention is not limited thereto and may have a configuration to execute the above-mentioned adjustment in a whole conveyor line. However, since it might considerably increase a cost on capital investment, it is preferable to have the adjusting area Z for adjusting intervals in a predetermined section as described in the preferred embodiment.

The preferred embodiment employs a brushless motor as the measuring means so as to measure an interval between articles by using the number of pulses, but the present invention is not limited thereto. For example, there may be provided a timer in the zone controller 15, so as to measure an interval by using a difference of time points when articles pass the presence sensor D. In this case, a predetermined range is a predetermined value of time A with a leeway ±a, being designated as A±a.

In the preferred embodiment, the adjusting area Z consists of the four control zones P, Q, R, and S, but the present invention is not limited thereto. The number of control zones constituting the adjusting area Z may be appropriately determined as long as the area Z consists of two or more control zones.

In the preferred embodiment, the conveyor line in the conveyor 1 is divided into the conveying area X and the adjusting area Z, but the present invention is not limited thereto and may include a sorting area in the conveyor 1. The sorting area in such a case has a configuration having a belt conveyor, a roller conveyor, or a lifter.

In the preferred embodiment, the adjusting area Z is disposed downstream of and adjacent to the conveying area X and upstream of and adjacent to the sorting conveyor Y, but the present invention is not limited thereto, and the adjusting area Z may be disposed in the middle of or the most upstream of the conveying area X. In such a case, the adjusted intervals between articles might be disarranged as the articles are conveyed downstream in the conveying direction. Thus, it is preferable to dispose the adjusting area Z upstream of and adjacent to the sorting conveyor Y as described in the above-mentioned preferred embodiment.

In the preferred embodiment, all the conveyor units 2p, 2q, 2r, and 2s constituting the adjusting area Z and the plurality of conveyor units constituting the conveying area X in the conveyor 1 have the same configuration, but the present invention is not limited thereto. For example, the conveyor units 2 constituting the adjusting area Z and the conveyor units constituting the conveying area X may have different configurations. Alternatively, the present invention is embodied even if the conveying area X is not divided into a plurality of conveyor units and is a sole unit. Further, all the conveyor units constituting the adjusting area Z need not to have the same configuration though it is simplest and easily-controlled to provide all the units in the same configuration.

In the preferred embodiment, the conveying speed in each zone is selected from three levels of speed consisting of a normal speed, a lower speed, and a higher speed, but the present invention is not limited thereto. For example, the lower speed and/or the higher speed may be divided into a plurality of levels, so that the conveying speed is selected from more than three levels of speed. Alternatively, the conveying speed may be varied not in a stepwise fashion but in a continuous (i.e., stepless) fashion. Alternatively, the conveying speed may be selected only from two levels of speed consisting of the normal speed and the lower speed.

In the preferred embodiment, an interval of articles is adjusted by either increasing or decreasing of a conveying speed of an article (second article) behind another article (first article) among two adjacent articles in the conveying direction, but the present invention is not limited thereto. It is possible to either increase or decrease a conveying speed of the first article. It is also possible to either increase or decrease conveying speeds of both the first and second articles. For example, supposing that the conveying speed is selected from two levels of speed consisting of the normal speed and the lower speed, the conveying speed of the second article may be reduced in a case where the interval is below the lower limit, and the conveying speed of the first article may be reduced in a case where the interval is beyond the upper limit.

In the preferred embodiment, intervals between articles may be adjusted so as to be between the upper limit and the lower limit, but the present invention is not limited thereto. For example, it is possible to adjust the interval only based on the lower limit and allow a wide interval.

The invention claimed is:

1. A conveyor comprising a plurality of zones arranged in a row in a conveying direction, each of the zones having at least one driving motor for generating power to convey articles in the zone and an article sensor for detecting an article in the zone and for transmitting a signal indicating presence or absence of an article,
wherein the conveyor further comprises (1) a measuring structure through which either an interval between adjacent articles in the conveying direction or a difference of time points when adjacent articles in the conveying direction pass the article sensor acting as a benchmark is measured and (2) a motor controller for each of the zones and for varying a rotational speed of the driving motor,
wherein the measuring structure measures the interval or the difference upon reception of signals from the sensor, and
wherein the motor controller either accelerates or slows down the rotational speed of the driving motor in a zone in which at least one of the articles is placed so as to either increase or decrease a speed for conveying articles, thereby adjusting the interval between the articles,
the conveyor being adapted to accelerate the rotational speed of the driving motor relating to an article adjacent to and behind another article in the conveying direction in a case where either the interval or the difference is beyond a predetermined upper limit so as to thereby adjust the interval by narrowing the interval,
the conveyor being adapted to slow down the rotational speed of the driving motor relating to the article in a case where either the interval or the difference is below a predetermined lower limit so as to thereby adjust the interval by widening the interval.

2. The conveyor as defined in claim 1,
being adapted to either accelerate or slow down the rotational speed of the driving motor in a case where either the interval or the difference is out of a predetermined range.

3. The conveyor as defined in claim 1,
wherein the conveyor is adapted to both: a) accelerate the rotational speed of the driving motor relating to an article adjacent to and behind another article in the conveying direction in the case where either the interval or the difference is beyond a predetermined upper limit; and b) slow down the rotational speed of the driving motor relating to the article in the case where either the interval or the difference is below a predetermined lower limit.

4. The conveyor as defined in claim 1,
having a first area for adjusting the intervals between articles and a second area without adjusting the intervals,
wherein the motor controller is for the first area, and
wherein the first area includes a plurality of zones arranged in a row in the conveying direction.

5. The conveyor as defined in claim 4,
wherein the first area is disposed downstream of the second area.

6. The conveyor unit as defined in claim 4,
wherein the second area also includes a plurality of zones arranged in a row in the conveying direction.

7. The conveyor as defined in claim 4,
having a sorting area adapted to sort a plurality of kinds of articles and disposed adjacent to and downstream of the first area in the conveying direction.

8. The conveyor as defined in claim 1,
wherein the plurality of zones include a first zone, a second zone adjacent to and upstream of the first zone, and a third zone, and
the conveyor being adapted to stop the driving motor in the second zone in a case where the rotational speed of the driving motor driving the first zone is slowed down compared to the rotational speed of a driving motor driving the third zone and the sensor in the second zone detects an article.

9. The conveyor as defined in claim 1,
being adapted to stop the driving motor in a zone in which the sensor has not detected an article for a predetermined period of time.

10. The conveyor as defined in claim 1,
wherein each of the zones has at least one conveying roller driven by the driving motor.

11. The conveyor as defined in claim 1,
wherein each of the zones has at least one conveying roller, at least one of the conveying rollers being a motorized roller incorporating the driving motor.

12. The conveyor as defined in claim 1,
wherein the driving motor is a brushless motor incorporating a Hall element for monitoring a rotational position of the motor and for outputting pulses according to the position, so that the measuring means measures the interval between articles based on the number of the pulses.

13. The conveyor as defined in claim 1,
wherein in the event that an article sensor in a particular zone detects an article and time after detecting the article reaches a predetermined value without detecting a following article, the rotational speed of the driving motor on the particular zone is increased.

14. The conveyor as defined in claim 13 where in the event that the rotational speed of the motor in the particular zone increases, and a following article is not detected for a predetermined time after the rotational speed of the motor in the particular zone is increased, the motor in the particular zone is stopped.

15. A conveyor controller for controlling a conveyor,
wherein the conveyor comprises a plurality of zones arranged in a row in a conveying direction, each of the zones having at least one driving motor for generating power to convey articles in the zone and an article sensor for detecting an article in the zone and for transmitting a signal indicating presence or absence of an article,
wherein the conveyor controller comprises (1) a measuring structure through which either an interval between adjacent articles in the conveying direction or a difference of time points when adjacent articles in the conveying direction pass the article sensor acting as a benchmark is measured and (2) a motor controller for each of the zones and for varying a rotational speed of the driving motor, and
wherein, upon reception of signals from any of the sensors, the measuring structure measures the interval or the difference and the motor controller either accelerates or slows down the rotational speed of the driving motor in a zone in which at least one of the adjacent articles in the conveying direction is placed, so that the conveyor controller either increases or decreases a speed for conveying articles so as to adjust the interval between the articles,
the conveyor being adapted to accelerate the rotational speed of the driving motor relating to an article adjacent to and behind another article in the conveying direction in a case where either the interval or the difference is beyond a predetermined upper limit so as to thereby adjust the interval by narrowing the interval,
the conveyor being adapted to slow down the rotational speed of the driving motor relating to the article in a case where either the interval or the difference is below a predetermined lower limit so as to thereby adjust the interval by widening the interval.

16. The conveyor as defined in claim 15,
wherein in the event that an article sensor in a particular zone detects an article and time after detecting the article reaches a predetermined value without detecting a following article, the rotational speed of the driving motor on the particular zone is increased.

17. The conveyor as defined in claim 15,
wherein the conveyor is adapted to both: a) accelerate the rotational speed of the driving motor relating to an article adjacent to and behind another article in the conveying direction in the case where either the interval or the difference is beyond a predetermined upper limit; and b) slow down the rotational speed of the driving motor relating to the article in the case where either the interval or the difference is below a predetermined lower limit.

18. The conveyor as defined in claim 16 where in the event that the rotational speed of the motor in the particular zone increases, and a following article is not detected for a predetermined time after the rotational speed of the motor in the particular zone is increased, the motor in the particular zone is stopped.

* * * * *